United States Patent

Ryu

[11] Patent Number: 5,964,878
[45] Date of Patent: Oct. 12, 1999

[54] METHOD FOR CONTROLLING OPERATION OF OPTICAL DISK DRIVE IN POWER SAVING MODE

[75] Inventor: Chang-Hyun Ryu, Sungnam, Rep. of Korea

[73] Assignee: Samsung Electronics Co., Ltd., Suwon, Rep. of Korea

[21] Appl. No.: 08/914,030

[22] Filed: Aug. 14, 1997

[30] Foreign Application Priority Data

Aug. 14, 1996 [KR] Rep. of Korea ...................... 96-33803

[51] Int. Cl.[6] .................................................. G06F 1/32
[52] U.S. Cl. .......................... 713/323; 713/324; 713/320
[58] Field of Search ........................ 395/750.03–750.08, 395/828–839, 281–283; 360/69, 71, 73.01, 73.03, 74.1, 75, 78.01

[56] References Cited

U.S. PATENT DOCUMENTS

| 5,365,502 | 11/1994 | Misono | 360/75 |
|---|---|---|---|
| 5,408,369 | 4/1995 | Miura et al. | 395/750.01 |
| 5,408,668 | 4/1995 | Tornai | 395/750.01 |
| 5,452,277 | 9/1995 | Bajorek et al. | 369/54 |
| 5,463,601 | 10/1995 | Yanagisawa | 364/32 |
| 5,481,733 | 1/1996 | Douglis et al. | 395/750.01 |
| 5,483,464 | 1/1996 | Song | 364/492 |
| 5,493,670 | 2/1996 | Douglis et al. | 395/750.01 |
| 5,517,649 | 5/1996 | McLean | 395/750.01 |
| 5,535,400 | 7/1996 | Belmont | 395/750.01 |
| 5,574,920 | 11/1996 | Parry | 395/750.01 |
| 5,598,577 | 1/1997 | Overfield | 395/830 |
| 5,675,761 | 10/1997 | Paul et al. | 395/404 |
| 5,682,273 | 10/1997 | Hetzler | 360/75 |
| 5,752,050 | 5/1998 | Hernandez et al. | 395/750.07 |
| 5,774,292 | 6/1998 | Georgiou et al. | 360/73.03 |

Primary Examiner—Ayaz R. Sheikh
Assistant Examiner—Raymond N Phan
Attorney, Agent, or Firm—Robert E. Bushnell, Esq.

[57] ABSTRACT

A method for controlling operation of an optical disk drive in a computer having the optical disk drive, a hard disk drive and a power management controller. The power management controller generates a power saving control signal when the computer system is suspended in use for a predetermined time period. If the power saving control signal is generated, a central processing unit (CPU) determines whether the optical disk drive is in operation in order to block the power supplied to either all components of the computer system or the components of the computer system except for the optical disk drive. That is, if the optical disk drive is not in operation, power is blocked to all components of the computer system. If the optical disk drive is in operation, however, power is blocked to components of the computer system except the optical disk drive and its associated components.

20 Claims, 3 Drawing Sheets

METHOD FOR CONTROLLING OPERATION OF OPTICAL DISK DRIVE IN POWER SAVING MODE

CLAIM FOR PRIORITY

This application makes reference to, incorporates the same herein, and claims all benefits accruing under 35 U.S.C. §119 from an application for METHOD FOR CONTROLLING OPERATION OF OPTICAL DISK DRIVE earlier filed in the Korean Industrial Property Office on Aug. 14, 1996, and there duly assigned Serial No. 33803/1996, a copy of which application is annexed hereto.

BACKGROUND OF THE INVENTION

1. Technical Field

The present invention relates to an optical disk drive such as compact disk read-only-memory (CD-ROM) drive and digital video disk read-only-memory (DVD-ROM) drive for computer systems, and more particularly relates to a method for controlling operation of an optical disk drive in a power saving mode of a computer system.

2. Related Art

Most computer systems in use today include hard disk drives and optical disk drives such as CD-ROM drives and DVD-ROM drives which are memory devices that contain a transducer head, a motor and one or more disks that store information. The motor turns a disk underneath the transducer head. A typical disk contains electrically encoded data that is detected by the transducer head which can be magnetic or optical as the head passes over the disk. The disk can be read from during a read operation or written to during a write operation of the disk drive as the transducer head is moved along a radius of the disk and the disk spins under the transducer head.

Unfortunately, constantly spinning the disk in the disk drive consumes a large amount of power. Specifically, a motor must be devoted to spinning the disk to allow access to the full physical array of data on the disk. Powering a mechanical device such as a motor consumes a significant amount of power relative to the power consumed by the electronic circuitry within a computer. Consequently, it has become highly desirable to reduce the power consumption in order to maximize the energy efficiency, particularly when the computer systems such as laptop or notebook computers use a rechargeable battery as a power source.

One power management technique commonly used for hard disk drives in portable computer systems is turning off the disk drive motor when the hard disk drive has not been used recently. There are several methods of turning off the disk drive motor while leaving the remainder of the computer circuitry on. Many computers include a "sleep" button for allowing the user to power down the disk drive motor without powering down the entire computer in order to conserve battery power that would otherwise be wasted when the hard disk drive is not being accessed. Other methods of powering down the disk drive include programming a Basic Input/Output System (BIOS) driver to power down the disk drive after the passage of a predetermined time period during which the disk drive has not been accessed. Contemporary adaptive power management techniques for hard disk drives are disclosed, for example, in U.S. Pat. No. 5,574,920 for *Method For Controlling Power Down Of A Hard Disk Drive In A Computer* issued to Parry, U.S. Pat. No. 5,535,400 for *SCSI Disk Drive Power Down Apparatus* issued to Belmont, U.S. Pat. No. 5,517,649 for *Adaptive Power Management For Hard Disk Drives* issued to McLean, U.S. Pat. No. 5,493,670 for *Adaptive Disk SPIN-Down Method For Managing The Power Distributed To A Disk Drive In A Laptop Computer* issued to Douglis et al., U.S. Pat. No. 5,481,733 for *Method For Managing The Power Distributed To A Disk Drive In A Laptop Computer* issued to Douglis et al., U.S. Pat. No. 5,452,277 for *Adaptive System For Optimizing Disk Drive Power Consumption* issued to Bajorek et al., and U.S. Pat. No. 5,408,369 for *Power Saving System For Rotating Disk Data Storing Apparatus* issued to Miura et al. Other power management systems for computer peripherals as disclosed, for example, in U.S. Pat. No. 5,408,668 for *Method And Apparatus For Controlling The Provision Of Power To Computer Peripherals* issued to Tornai, and U.S. Pat. No. 5,483,464 for *Power Saving Apparatus For Use In Peripheral Equipment In A Computer* issued to Song and assigned to the same assignee of the instant application are used to facilitate suspending and resuming operation of the computer system in order to minimize power consumption during its use.

Typical power management system for computer systems offer a number of features: First, it lowers a system clock frequency when a computer system is not in use for a predetermined time period after access has been made to the computer system. Second, it automatically shuts off power supply to a display monitor when there is no activity in a keyboard or mouse for a predetermined time period. Third, it suspends motor drive operation in hard disk drive if no access has been made to the disk drive for a predetermined time period. The power management scheme is based in part on shutting off power supply directed to the energy consuming parts or peripheral of the computer system, if the computer system is inactive for a predetermined time period. The power saving feature is particularly useful to battery powered computer systems using LCD display panels such as laptop and notebook computers, where most of the power consumption is attributed to disk drive operation.

Most contemporary power management schemes are not directly applicable to optical disk drives such as CD-ROM drives and DVD-ROM drives. Power management controller does not recognize operation of an audio CD during reproduction or playback while performing a power saving mode. In particular, when an audio CD is reproduced in an optical disk drive according to a specific application program in which a display function indicating the status of the CD and other functions are required, the power management controller does not perform the power saving mode. However, where the audio CD is reproduced in the optical disk drive, and the optical disk drive operates even after termination of the application program, the power management controller does not recognize that the audio CD is in reproduction and performs the power saving mode. The failure to recognize that the audio CD is in reproduction, as I have observed, can severely impact overall operation of the computer system.

SUMMARY OF THE INVENTION

Accordingly, it is therefore an object of the present invention to provide a new and improved power saving method for an optical disk drive in a computer system such as a battery powered computer.

It is also an object to provide a power saving method for an optical disk drive that can effectively reduce power consumption in a computer system.

It is another object to provide a method for controlling operation of an optical disk drive by checking operation of an optical disk drive motor to determine whether an audio compact disk (CD) is reproduced and, if the audio CD is reproduced, performing a power saving mode suitable for such a situation.

These and other objects of the present invention can be achieved by a method for controlling operation of an optical disk drive in a computer system having at least an optical disk drive and a power management controller which comprises the steps of allowing the power management controller to generate a power saving control signal when the computer system is suspended in use for a predetermined time period; determining whether the optical disk drive is in operation, if the power saving control signal is generated; blocking power supply to all components of the computer system when the optical disk drive is not in operation; and blocking power supply to components of the computer system except the optical disk drive and the associated components when the optical disk drive is in operation.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 2A and 2B are flowcharts illustrating a control process of controlling operation of an optical disk drive according to the principles of the present invention, wherein:

FIG. 2A is a flowchart illustrating a system initialization operation when power of the computer system is turned on; and FIG. 2B is a flowchart illustrating an optical disk drive control operation when a power saving mode is performed.

DETAILED DESCRIPTION OF THE PREFERRED EMBODIMENT

Figure 1:
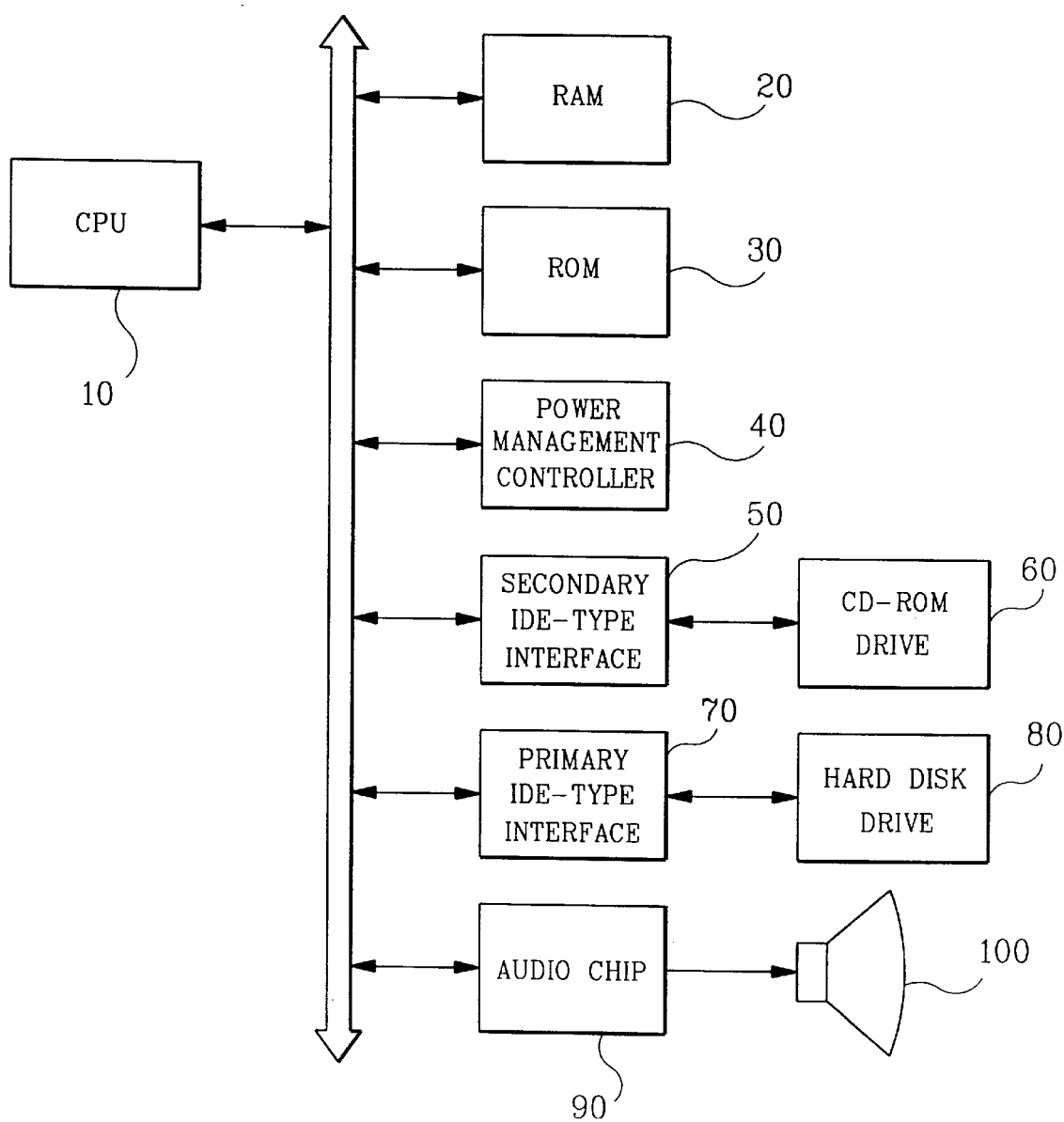
FIG. 1 is a schematic block diagram illustrating a computer system having a hard disk drive and an optical disk drive constructed according to the principles of the present invention.

Referring now to the drawings and particularly to FIG. 1, which illustrates a computer system having an optical disk drive and a hard disk drive constructed according to the principles of the present invention. As shown in FIG. 1, the computer system comprises a central processing unit (CPU) 10 for controlling overall operation of the computer system, a random-access-memory (RAM) 20, a basic input/output system read-only-memory (BIOS ROM) 30, a power management controller 40, a secondary IDE-type interface 50 connected to CD-ROM drive 60, a primary IDE-type interface 60 connected to hard disk drive 80, an audio chip 90 connected to speaker 100.

BIOS ROM 30 is used to store an optical disk access operation/motor operation checking program therein. The CPU 10 executes the program stored in BIOS ROM 30 to control overall operation of the computer system. The RAM 20 then stores data processed by the CPU 10. The power management controller 40 determines whether the system is operated for a predetermined time period and, if the system is not operated for the predetermined time period, informs the CPU 10 of such a situation. The secondary IDE-type interface 50 performs an interfacing operation with the optical disk drive 60. Likewise, the primary IDE-type interface 70 performs an interfacing operation with the hard disk drive 80, and the audio chip 90 is used to amplify audio data from an optical disk and drive the speaker 100.

Figure 2A:
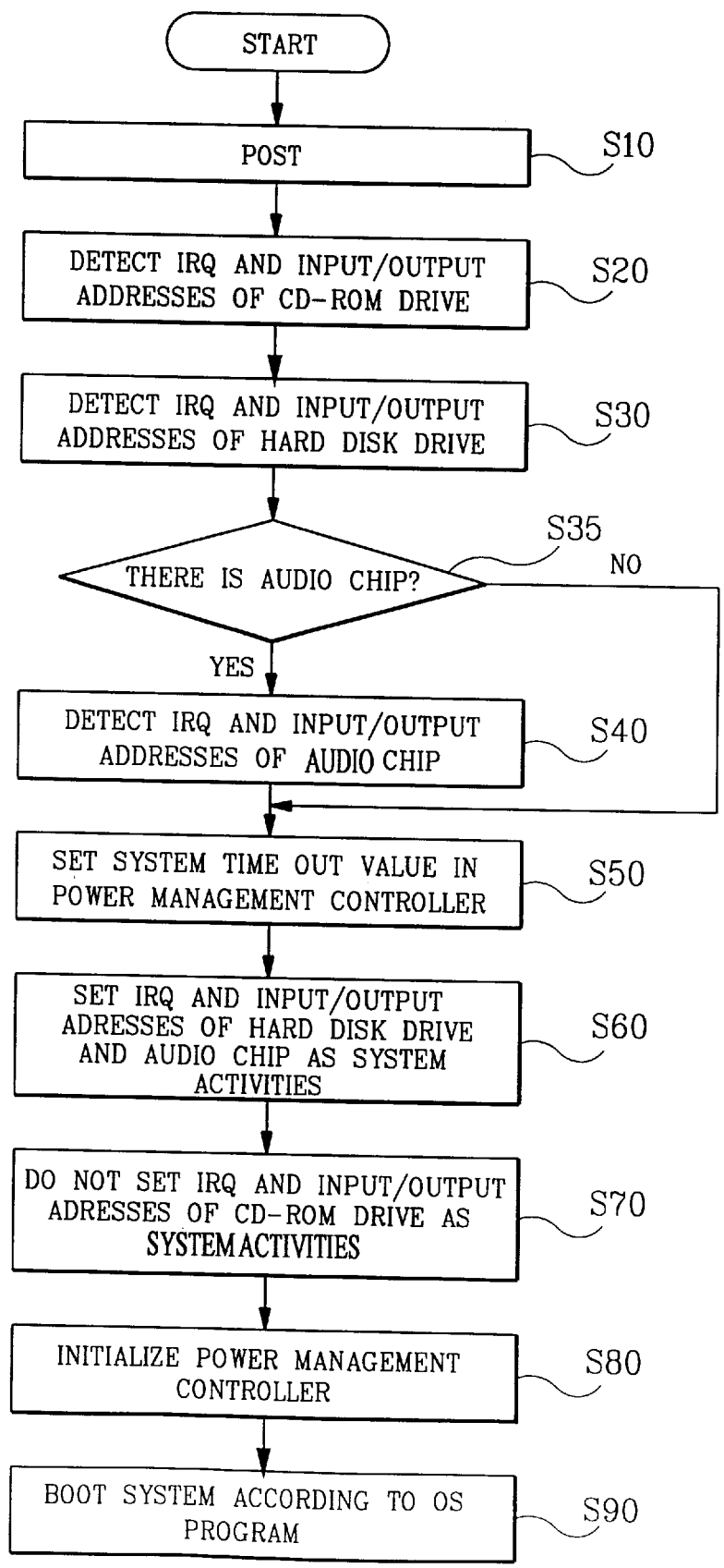

Turning now to FIG. 2 which illustrates a process of controlling operation of the optical disk drive 60 according to the principles of the present invention. FIG. 2A is a flowchart illustrating a system initialization operation when power of the computer system is turned on. First, if the power of the computer system is turned on, the CPU 10 performs a power-on self test (POST) operation according to a system BIOS program at step S10. At this time, the CPU 10 detects an interrupt request value IRQ and input/output addresses of the optical disk drive 60 at step S20. The CPU 10 then detects an interrupt request value IRQ and input/output addresses of the hard disk drive 80 at step S30 and then determines whether there is an audio chip 90 installed in the computer system at step S35. If the audio chip 90 is installed in the computer system, the CPU 10 next detects an interrupt request value IRQ and input/output addresses of the audio chip 90 at step S40. If the audio chip 90 is not installed in the computer system, the CPU 10 bypasses step S40.

After the interrupt request value IRQ and input/output addresses of the audio chip are detected at step S40, the CPU 10 sets a system time out value in the power management controller 40 at step S50. Then, the CPU 10 sets the detected interrupt request values IRQ and input/output addresses of the hard disk drive 80 and audio chip 90 as system activities at step S60, and does not set the detected interrupt request value IRQ and input/output addresses of the optical disk drive 60 as system activities at step S70. Then, the CPU 10 initializes the power management controller 40 at step S80 and boots the system according to an operating system (OS) program at step S90.

Figure 2B:
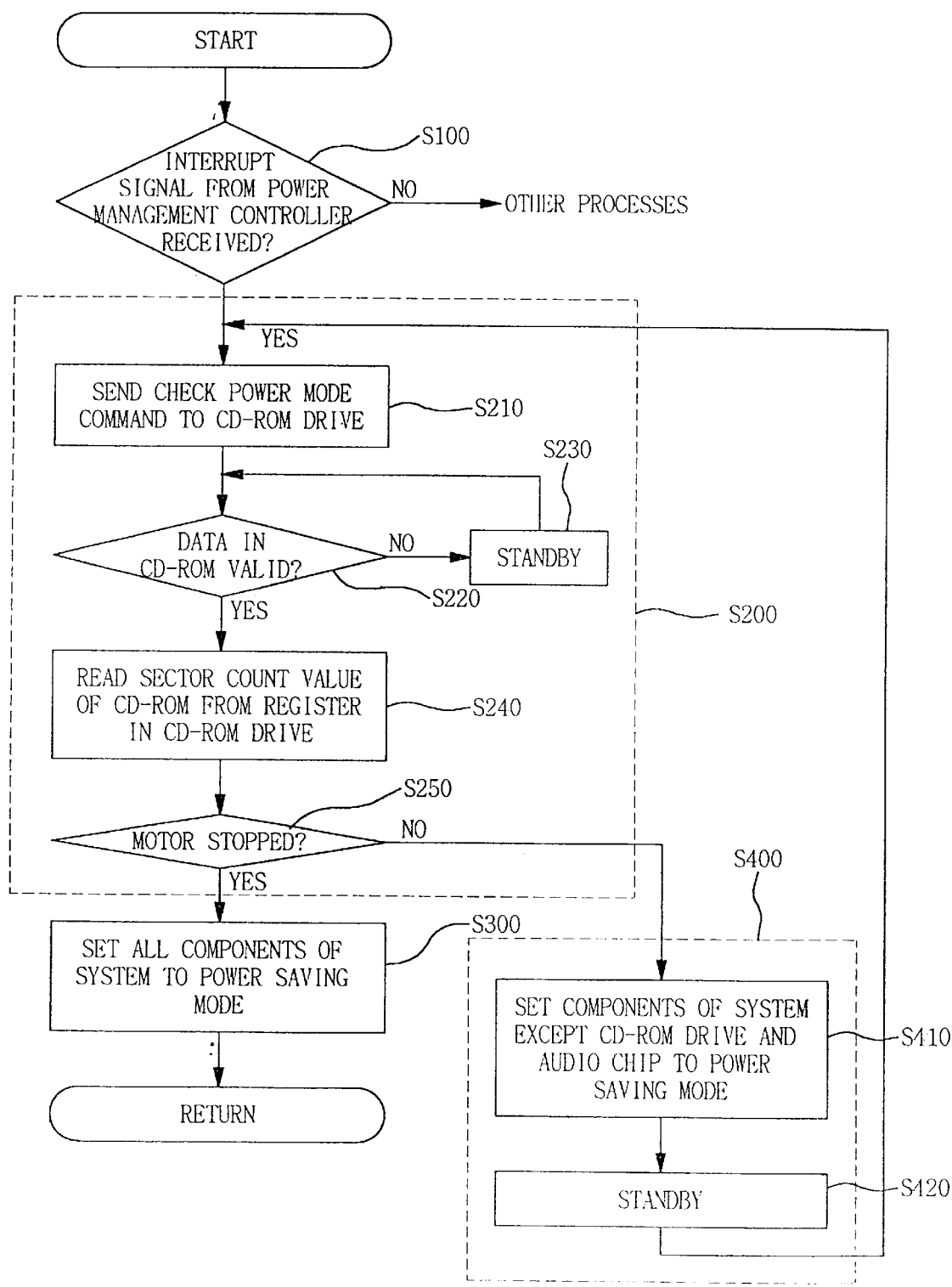

FIG. 2B is a flowchart illustrating an optical disk drive control operation when a power saving mode is performed. First, upon receipt of an interrupt signal from the power management controller 40 indicating the power saving mode at step S100, the CPU 10 sends a "check power mode" command to the optical disk drive 60 at step S200 in order to read a sector count value of the optical disk from a register in the optical disk drive 60 and to determine, in accordance with the read sector count value, whether a motor of the optical disk drive 60 is in operation. When it is determined at step S200 that the motor of the optical disk drive 60 is not in operation, the CPU 10 sets all components of the system to the power saving mode at step S300. However, in the case where it is determined at step S200 that the motor of the optical disk drive 60 is in operation, the CPU 10 sets components of the system except the optical disk drive 60 and audio chip 90 to the power saving mode at step 400. Namely, at step 400, the CPU 10 operates only the optical disk drive 60 and a subsystem for the output of a reproduced signal from an audio CD and supplies no power to all other system components in order to minimize power consumption.

Now, a process of controlling operation of an optical disk drive 60 in the computer system according to the principles of the present invention will be described in detail with reference to FIGS. 1, 2A and 2B hereinbelow.

First, if power is applied to the system, the CPU 10 performs the POST operation according to the system BIOS program at step S10. At this time, the CPU 10 detects an interrupt request value IRQ and input/output addresses of the optical disk drive 60 at step S20, an interrupt request value IRQ and input/output addresses of the hard disk drive 80 at step S30 and an interrupt request value IRQ and input/output addresses of the audio chip 90 at step S40. Also, the CPU 10 sets a system time out value in the power management controller 40 at step S50. When the system is suspended in use for an interval of the set system time out value, the power saving mode is performed.

In order to indicate that the system is in use, the CPU 10 sets the detected interrupt request values IRQ and input/output addresses of the hard disk drive 80 and audio chip 90 as system activities at step S60. Otherwise, the CPU 10 does not set the detected interrupt request value IRQ and input/output addresses of the optical disk drive 60 as system activities at step S70, so that it does not check the optical disk drive 60 when the power management controller 40 generates an interrupt signal to perform the power saving mode.

Then, the CPU 10 initializes the power management controller 40 at step S80 and boots the system according to the OS program at step S90. On the other hand, the power management controller 40 checks the audio chip 90 and hard disk drive 80 to discriminate whether the system is not in use for a predetermined time period. If the system is not in use for the predetermined time period, the power management controller 40 sends the interrupt signal to the CPU 10 to perform the power saving mode. Upon receipt of the interrupt signal from the power management controller 40 at step S100, the CPU 10, before performing the power saving mode, sends the "check power mode" command to the optical disk drive 60 at step S210 to determine whether the motor of the optical disk drive 60 is in operation. At step S220, the CPU 10 determines whether data in the CD-ROM is valid. If it is determined at step S220 that data in the optical disk is not valid, the CPU 10 stands by for a predetermined time period at step S230 and then returns to step S220 to again check whether data in the optical disk is valid.

In the case where it is determined at step S220 that data in the optical disk is valid, the CPU 10 reads a sector count value of the optical disk from the register in the optical disk drive 60 at step S240 to check at step S250 whether the motor of the optical disk drive 60 is in operation.

The read sector count value indicates whether the audio CD is in reproduction, namely, whether the motor of the optical disk drive 60 is in operation. If it is determined at step S250 that the motor of the optical disk drive 60 is not in operation, the CPU 10 controls a power supply circuit (not shown) at step S300 to set the optical disk drive 60 with other components of the system to the power saving mode. However, in the case where it is determined at step S250 that the motor of the optical disk drive 60 is in operation, the CPU 10 recognizes that the audio CD is in reproduction. Thus, at step S410, the CPU 10 leaves power to the optical disk drive 60 and the associated audio chip 90 and speaker 100 supplied thereto alone, while setting the remaining components of the system to the power saving mode.

The CPU 10 checks the operating state of the motor of the optical disk drive 60 in the same manner as described at an interval of predetermined time period. When the audio CD is reproduced up to the last track and the motor of the optical disk drive 60 is then stopped, the CPU 10 controls the power supply circuit to block power to the optical disk drive 60 and the associated audio chip 90 and speaker 100.

As apparent from the foregoing description, according to the present invention, the operation of the optical disk drive motor is checked to determine whether the audio CD is reproduced in the power saving mode. If it is determined that the audio CD is reproduced in the power saving mode, power is not blocked to the optical disk drive and the associated components. When the audio CD is completed in reproduction, however, the optical disk drive and the associated components enter the power saving mode.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling operation of an optical disk drive in a computer system including a hard disk drive and a control unit, said method comprising the steps of:

performing a power-on self-test operation when said computer system is first powered on, to set interrupt request values and input/output addresses of said hard disk drive and an audio chip to correspond to system activities, and to not set an interrupt request value and input/output addresses of said optical disk drive to correspond to system activities;

performing an operating system routine on said computer system to finish a boot-up process after said setting of said interrupt request values is performed, when said computer system is first powered on;

generating a power saving control signal, at said control unit, when said computer system is suspended in use for a predetermined time period;

determining whether said optical disk drive is in operation, when said power saving control signal is generated;

when said optical disk drive is not in operation setting first predetermined components of said computer system, including said optical disk drive and related optical disk drive components, to a power saving mode; and when said optical disk drive is in operation, setting second predetermined components of said computer system not including said optical disk drive and said related optical disk drive components, to said power saving mode.

2. The method of claim 1, further comprising checking operations of said hard disk drive and said audio chip to determine whether said computer system is in use.

3. The method of claim 2, further comprising blocking power to said first predetermined components of said computer system, including said optical disk drive and said related optical disk drive components, when said optical disk drive is not in operation.

4. The method of claim 1, further comprising detecting operation of a motor driving said optical disk drive to determine when said optical disk drive is in operation.

5. The method of claim 1, further comprising blocking power to said second predetermined components of said computer system not including said optical disk drive and said related optical disk drive components, when said optical disk drive is in operation.

6. A computer system, comprising:

a central processing unit controlling overall operation of said computer system;

a control unit generating a power saving control signal when said computer system is inactive for a predetermined time period;

a hard disk drive storing first data;

an audio chip processing audio data in accordance with said central processing unit;

an optical disk drive selectively receiving a disk storing second data;

said central processing unit performing a power-on self-test operation when said computer system is first powered on, to set interrupt request values and input/output addresses of said hard disk drive and said audio chip to correspond to system activities and to not set an interrupt request value and input/output addresses of said optical disk drive to correspond to system activities:

said central processing unit performing an operating system routine on said computer system to finish a boot-up process after said setting of said interrupt request values is performed, when said computer system is first powered on; and said central processing unit responding to said power saving control signal to determine when said optical disk drive is in operation, setting first predetermined components of said computer system including said optical disk drive to a power saving mode when said optical disk drive is not in operation, and setting second predetermined components of said computer system not including said optical disk drive to said power saving mode when said optical disk drive is in operation.

7. The computer system of claim 6, further comprising detecting operations of said hard disk drive and said audio chip to determine when said computer system is in use.

8. The computer system of claim 7, further comprising an audio compact disk reproduction circuit controlling an outputting of said second data.

9. The computer system of claim 7, further comprising a motor driving said optical disk drive, said central processing unit checking an operation of said motor of said optical disk drive to determine when said optical disk drive is in operation.

10. The computer system of claim 8, further comprising said central processing unit blocking power to said second predetermined components of said computer system not including said optical disk drive and not including said audio compact disk reproduction circuit, when said optical disk drive is in operation.

11. The computer system of claim 6, said optical disk drive corresponding to a compact disk read-only-memory (CD-ROM) drive.

12. The computer system of claim 6, said optical disk drive corresponding to a digital versatile disk read-only-memory (DVD-ROM) drive.

13. A method for controlling operation of an optical disk drive in a computer system including a hard disk drive, an audio chip, and a control unit, comprising:

performing a power-on self-test operation when said computer system is first powered on, to set interrupt request values and input/output addresses of said hard disk drive and said audio chip to correspond to system activities, and to not set an interrupt request value and input/output addresses of said optical disk drive to correspond to system activities;

performing an operating system routine on said computer system to finish a boot-up process after said setting of said interrupt request values is performed, when said computer system is first powered on;

generating a power saving control signal, at said control unit, when said computer system is inactive for a predetermined time period;

determining whether said optical disk drive is in operation, when said power saving control signal is generated; and setting predetermined components of said computer system not including said optical disk drive and not including related optical disk drive components to said power saving mode, when said optical disk drive is in operation.

14. The method of claim 17, further comprising checking operations of said hard disk drive and said audio chip to determine when said computer system is inactive.

15. The method of claim 13, further comprising:

setting said predetermined components of said computer system and said optical disk drive to a power saving mode when said optical disk drive is not in operation; and checking operation of a motor of said optical disk drive to determine whether said optical disk drive is in operation.

16. The method of claim 15, further comprising:

when said optical disk drive is in operation blocking power to said predetermined components of said computer system and not blocking power to said optical disk drive and not blocking power to said related optical disk drive components.

17. The method of claim 13, further comprising sending a "check power mode" command to said optical disk drive upon receipt of said power saving control signal, determining whether data contained in said optical disk drive is valid, reading a sector count value of an optical disk from a register contained in said optical disk drive when data contained in said optical disk drive is valid, and checking whether a motor of said optical disk drive is in use to determine whether said optical disk drive is in operation.

18. The method of claim 17, further comprising blocking power supply to said predetermined components of said computer system not including said optical disk drive and not including said related optical disk drive components, when said optical disk drive is in operation.

19. The method of claim 17, said optical disk drive corresponding to a compact disk read-only-memory (CD-ROM) drive.

20. The method of claim 17, said optical disk drive corresponding to a digital versatile disk read-only-memory (DVD-ROM) drive, said digital versatile disk read-only-memory drive selectively receiving a disk storing video and audio data.

* * * * *